United States Patent [19]

Harder, Jr.

[11] 4,369,995
[45] Jan. 25, 1983

[54] WHEELCHAIR AND OCCUPANT RESTRAINING APPARATUS

[75] Inventor: Arthur J. Harder, Jr., Franklin Park, Ill.

[73] Assignee: Coach & Car Equipment Corporation, Elk Grove Village, Ill.

[21] Appl. No.: 182,218

[22] Filed: Aug. 28, 1980

[51] Int. Cl.³ .......................... B60N 1/02; B60P 3/06; B60P 7/08
[52] U.S. Cl. .................................. 296/65 A; 248/503; 280/751; 296/65 R; 410/9; 410/18; 410/51
[58] Field of Search ................. 105/129 SC; 248/503, 248/503.1; 280/748, 751, 752, 753; 296/65 R, 65 A; 297/217, 488; 410/2, 3, 4, 9, 18, 30, 50, 51; 417/921

[56] References Cited

U.S. PATENT DOCUMENTS

| 2,710,650 | 6/1955 | Sowder | 105/329 SC X |
| 4,019,752 | 4/1977 | Leon et al. | 296/65 R X |
| 4,093,303 | 6/1978 | Nelson | 296/65 R |
| 4,103,934 | 8/1978 | Arnholt et al. | 280/751 |
| 4,113,270 | 9/1978 | Barecki | 248/566 |
| 4,221,396 | 9/1980 | Kehl | 280/1 |
| 4,257,644 | 3/1981 | Stephens | 296/65 R |

Primary Examiner—Bruce H. Stoner, Jr.
Assistant Examiner—Howard Beltran
Attorney, Agent, or Firm—Merriam, Marshall & Bicknell

[57] ABSTRACT

A restraining apparatus in a vehicle, such as a bus, comprises a post movable from a depressed, horizontally extending position to an upright position. A U-shaped clamp on the upright post engages the front of a wheelchair wheel the back of which is engaged by another U-shaped clamp attached to the vehicle, to hold the wheelchair wheel in compression. A padded arm attached to the top of the post is movable from a retracted position, hanging down alongside the post, to a horizontally extending non-restraining position and then to a restraining position extending across the chest of the wheelchair occupant.

21 Claims, 12 Drawing Figures

WHEELCHAIR AND OCCUPANT RESTRAINING APPARATUS

BACKGROUND OF INVENTION

The present invention relates generally to an apparatus for restraining a wheelchair and its occupant in a moving vehicle such as a bus or subway car.

A conventional restraining apparatus for a wheelchair and its occupant usually comprises a plurality of separate, discrete parts. A first part constitutes a C-shaped, clamp-type device which engages around the rim of a wheelchair wheel and holds the wheel in tension. (See, for example, Barecki U.S. Pat. No. 4,113,270). With such devices care must be taken not to catch the spokes of the wheel when the latter is engaged by the clamping device.

Another part of the restraining apparatus comprises a conventional seatbelt which the occupant of the seat fastens about himself once the wheelchair has been locked into a restraining position by the clamp-type device. This seat belt comprises two abdomen belt segments, one extending from each side of the abdomen, plus another belt segment which pulls over the shoulder of the occupant for attachment to an abdomen belt segment. It is difficult for the wheelchair occupant to hook up this type of belt arrangement without the assistance of another. Thus, although the seat belt provides restraint in case of a frontal crash by the vehicle, it would be desirable to accomplish this function without a seat belt and its incumbent disadvantages.

SUMMARY OF THE INVENTION

A restraining apparatus in accordance with the present invention comprises a beltless structure which both restrains the wheelchair wheel and the wheelchair occupant. At the same time, the apparatus is readily manipulable from a storage to an operative disposition by the wheelchair occupant without outside assistance, and the apparatus eliminates entirely the need for resorting to seat belts. The apparatus holds the wheelchair wheel in compression, rather than in tension, and there is no possibility of catching the spokes of the wheelchair wheel because that part of the apparatus which restrains the wheel does not engage around that part of the wheel where the spokes are located, as do those devices which hold the wheel in tension.

All that is required on the part of the wheelchair occupant is to manipulate the wheelchair into a position alongside the restraining apparatus and then perform three simple movements with various parts of the apparatus. In doing so, he actuates both the wheelchair-restraining portion and the occupant-restraining portion. To deactuate the apparatus and return it to a non-operative or storage disposition requires three similar movements on the part of the occupant. Once the occupant-restraining part of the apparatus has been moved into an operative disposition, it is locked there and cannot be released therefrom without participation of both hands of the occupant. In addition, the wheelchair-restraining part of the apparatus is not readily deactuable until after the occupant-restraining part of the apparatus has been deactuated.

Other features and advantages are inherent in the structure claimed and disclosed or will become apparent to those skilled in the art from the following detailed description in conjunction with the accompanying diagrammatic drawings.

BRIEF DESCRIPTION OF THE DRAWING

FIG. 3 is an enlarged, fragmentary plan view, similar to to FIG. 2a;

DETAILED DESCRIPTION

Figure 1:
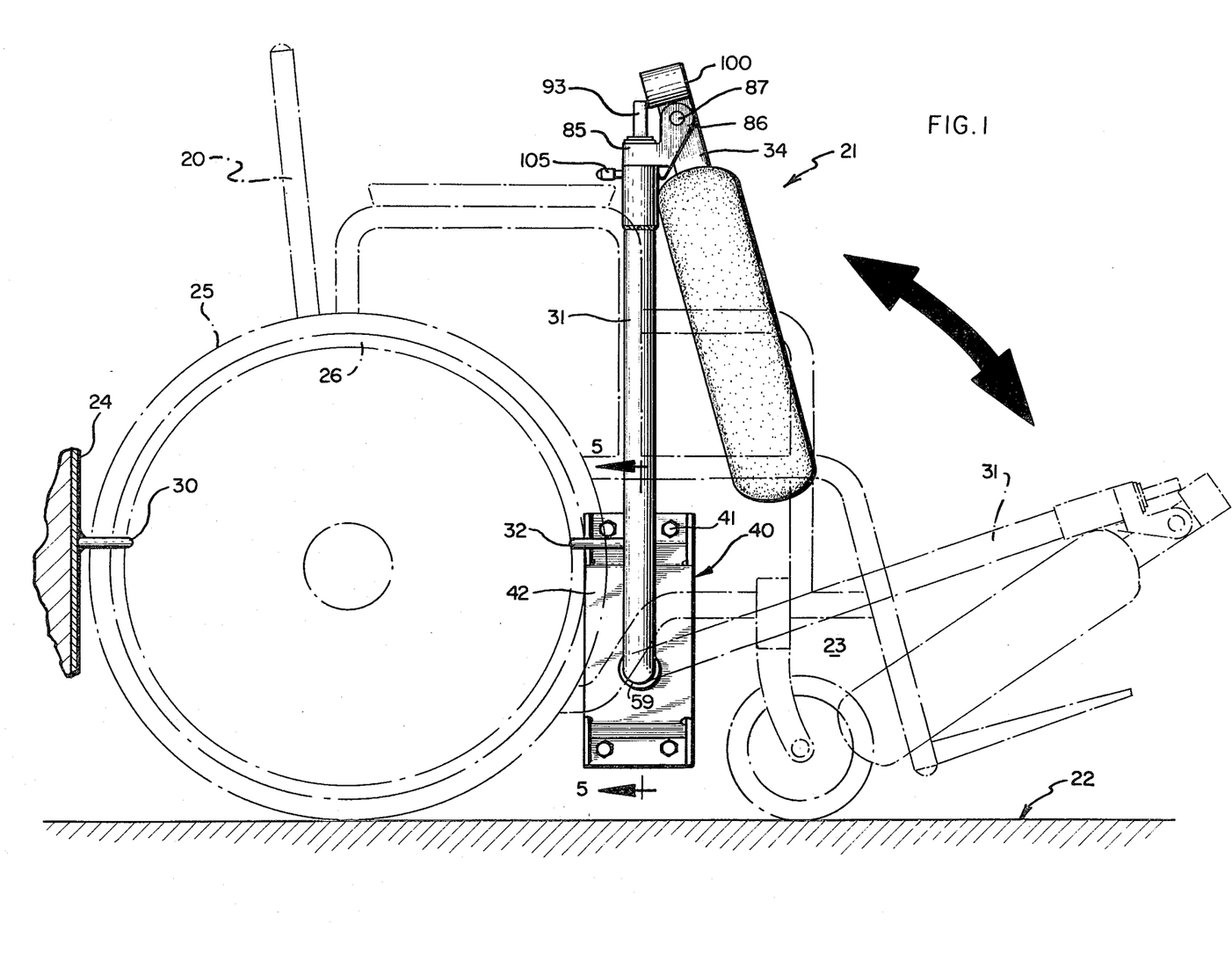
FIG. 1 is a side elevational view of an embodiment of a restraining apparatus in accordance with the present invention.

Referring initially to FIG. 1, indicated generally at 20 is a wheelchair (dash-dot lines) which is restrained in a vehicle, such as a bus, by a restraining apparatus indicated generally at 21. The bus or vehicle has a floor 22, a wall 23 and a member 24 which may be a second vehicle wall extending transversely to wall 23 or the front-facing part of a raised, folding vehicle seat. Mounted on member 24 is a first U-shaped element 30 comprising means for receiving the periphery of a wheelchair wheel 25. Located alongside vehicle wall 23, is an elongated post 31 mounted for pivotal movement between a depressed position (shown in dash-dot lines in FIG. 1), in which the post extends alongside the bottom of wall 23, and an upright position shown in full lines in FIG. 1.

Attached to post 31 is a second U-shaped element 32 located in opposed facing relation to first U-shaped element 30 when post 31 is in its upright position. Second U-shaped element 32 comprises means for receiving the periphery of wheelchair wheel 25 at a location thereon substantially diametrically opposite to the location thereon received in first U-shaped element 30. First and second U-shaped elements 30, 32 comprise means cooperating to hold wheelchair wheel 25 in compression between them.

Figures 1A, 2A, 4:
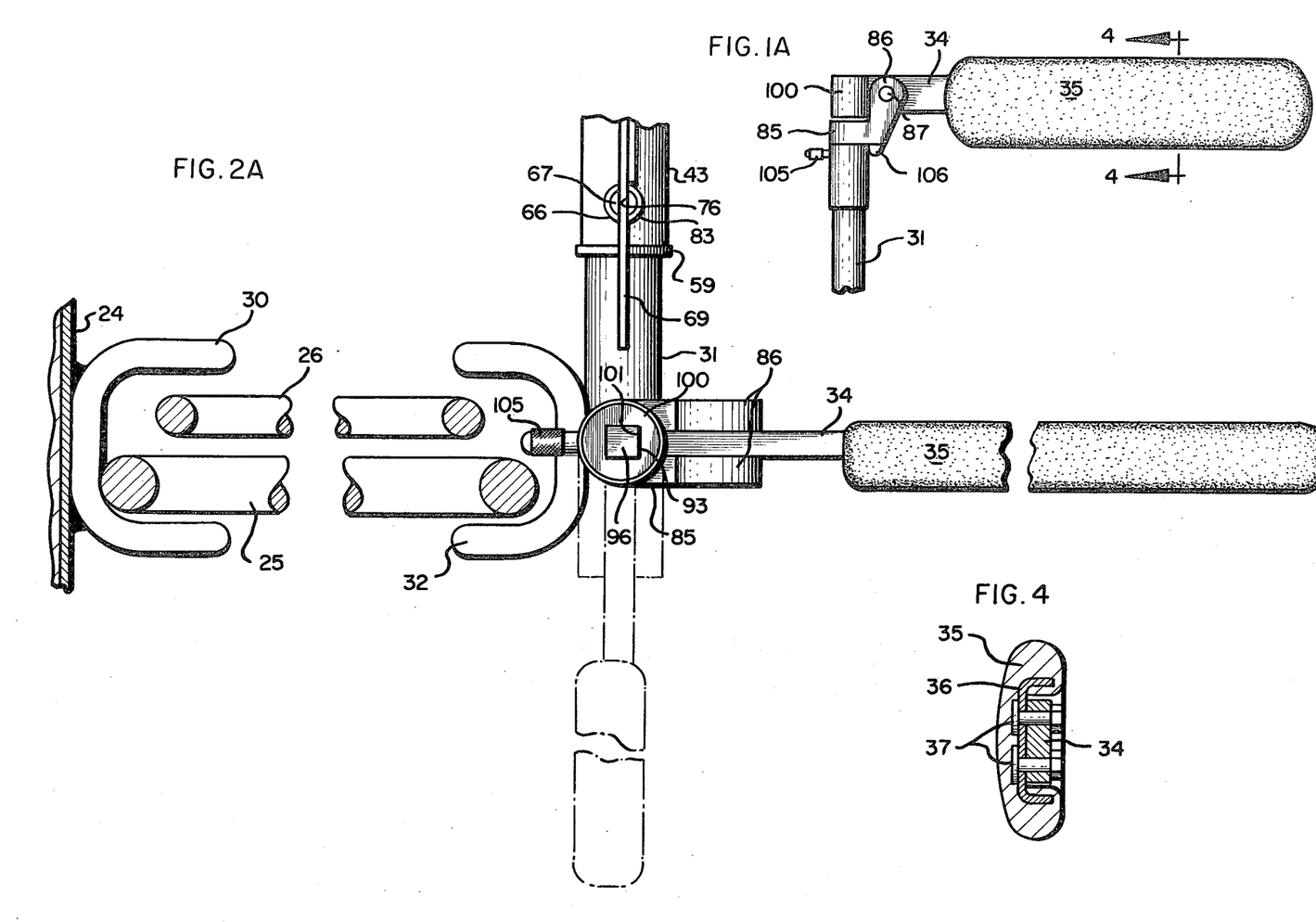
FIG. 1a is a fragmentary side elevational view showing a part of the apparatus in a different position than that of FIG. 1.
FIG. 2a is a plan view showing a part of the apparatus in a different position than that of FIG. 2.
FIG. 4 is a sectional view taken along line 4—4 in FIGS. 1a and 7.
Figure 2:
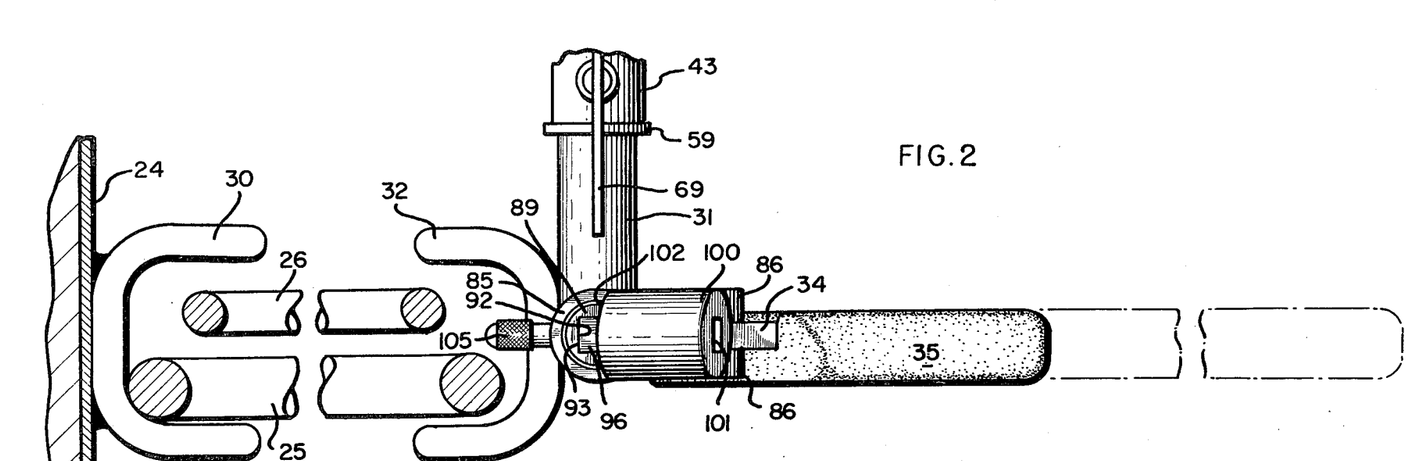
FIG. 2 is a plan, partially in section view of the apparatus of FIG. 1.
Figure 3:
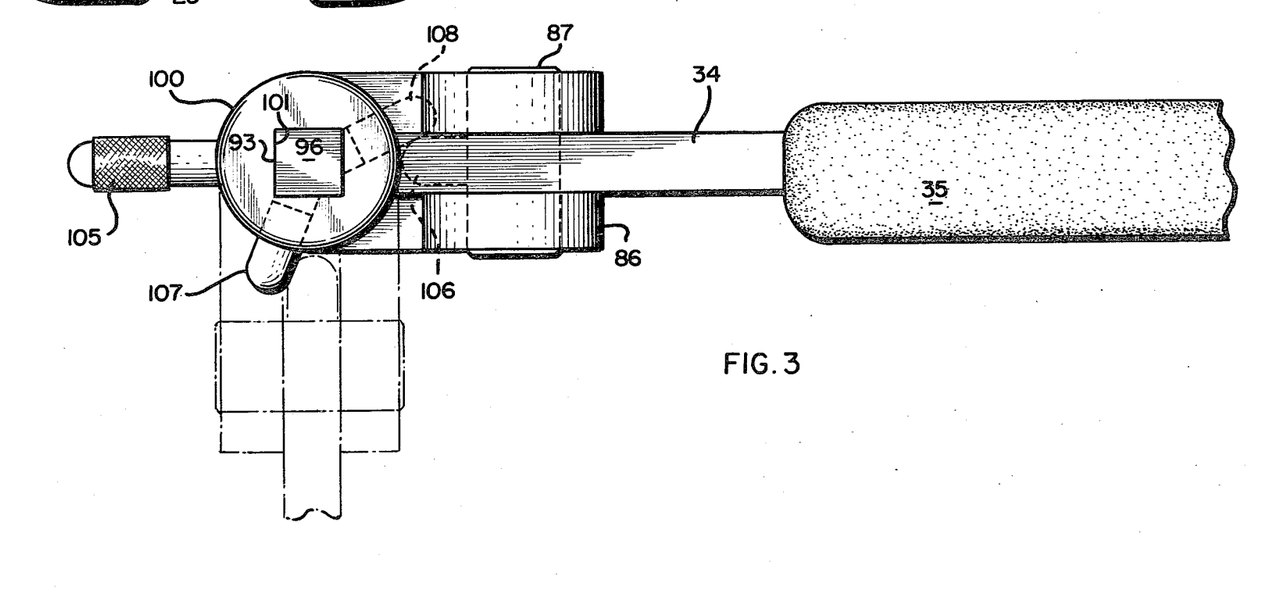

Also comprising part of apparatus 21 is a restraining arm 34 mounted on post 31 for pivotal movement about a first axis between a retracted position shown in FIG. 1, in which arm 34 extends alongside post 31, and an extended position, shown in FIG. 1a, in which arm 34 extends outwardly from post 31 along vehicle wall 23.

Apparatus 21 also comprises structure mounting restraining arm 34 for pivotal movement about a second axis, transverse to that arm's first pivotal axis, between the extended position shown in FIGS. 1a and 2a (full lines), and an operative or restraining position shown in dash-dot lines in FIG. 2a. In its restraining position, arm 34 extends transversely from wall 23 across the chest of an occupant in wheelchair 20.

In use, an occupant manipulates wheelchair 20, using handwheels 26, until wheel 25 is received within first U-shaped element 30. The occupant then reaches down, grabs depressed post 31 and raises it to the upright position shown in full lines in FIG. 1. This causes second U-shaped element 32 to engage the front of wheelchair wheel 25, thereby cooperating with element 30 to restrain wheel 25 against both forward and rearward movement. Post 31 is locked in its upright position by structure to be subsequently described. To raise restraining arm 34 from its retracted position to its extended position, the occupant grasps a lock handle member 105 on post 31 and depresses handle member 105 with one hand, while, with the other hand, he raises arm 34, pivoting it about the axis of a link pin 87. Then, to move restraining arm 34 from its extended position to a restraining position extending across the chest of the occupant, the occupant pivots arm 34 about the axis of post 31, while maintaining lock handle member 105 in its depressed position. After the restraining arm 34 has been moved to its restraining position, member 105 is released, whereupon it is urged by a spring 94 to return to its upper position. Until such time as handle member 105 is again depressed, restraining arm 34 cannot be pivoted about either of its two pivotal axes and this locks the restraining arm in its occupant-restraining position.

To deactivate the restraining apparatus, lock handle member 105 is depressed and restraining arm 34 is pivoted about the axis of post 31 to its non-restraining, extended position and then dropped about the axis of pin 87 to its retracted position (full lines in FIG. 1), whereupon handle member 105 may be released. The occupant then unlocks post 31 and pushes it down to its depressed storage position (dash-dot lines in FIG. 1.) This releases, from engagement with wheel 25, U-shaped element 32 mounted on post 31. The wheelchair can then be wheeled away from the position illustrated in FIG. 1.

Referring to FIGS. 1 and 5–8, there will now be described the details of the mounting structure for post 31.

Figure 5:
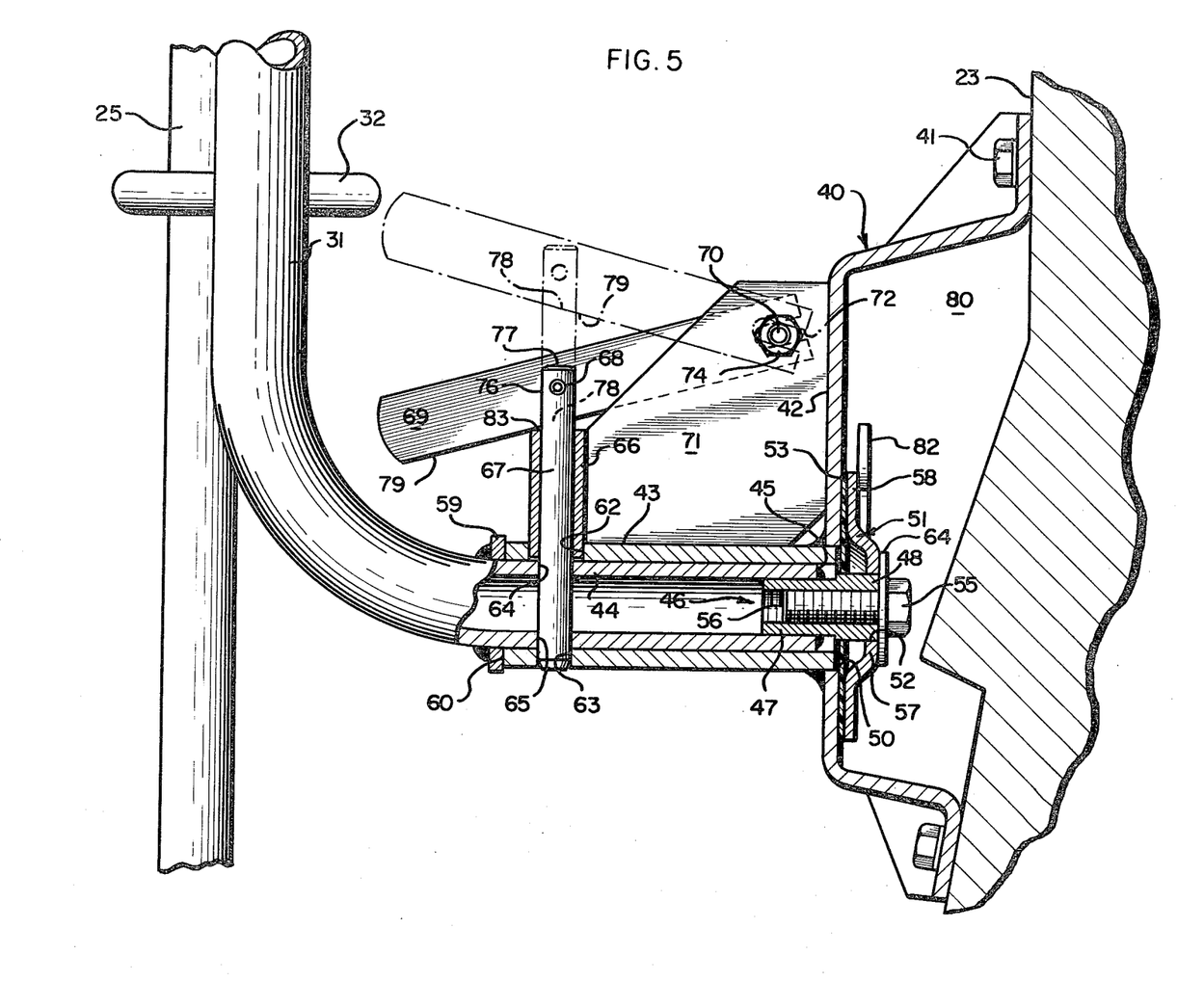
FIG. 5 is a sectional view taken along line 5—5 in FIG. 1.

Attached to vehicle wall 23 by bolts 41 is a housing or bracket 40 having a front wall 42 to which is attached, as by welding, one end of a tube or first cylindrical element 43 defining the axis of pivotal movement of post 31. Integral with post 31 is one end of a second cylindrical element 44 coaxial with and received in telescoping relation within tube 43. Cylindrical element 44 also has a second or terminal end 45 opposite that end which is integral with post 31, and attached to cylindrical element 44 at terminal end 45 is an internally threaded plug 46 having a threaded cylindrical portion 47 received within cylindrical element 44 and an end portion 48 having a rectangular cross-section located outside of cylindrical element 44. Housing front wall 42 has an opening 50, and plug end portion 48 extends through opening 50 as well as through an opening 52 in a bell-shaped, deformable compression element 51 composed of springable material such as spring steel.

The peripheral portions of compression element 51 bear against the inner surface of wall 42 on housing 40. Sandwiched between compression element 51 and housing wall 42 is a friction pad 53 composed of material such as polypropylene. Pad 53 has an opening therein and fits around the rectangular portion 48 of plug 46.

Threadedly received within cylindrical portion 47 of plug 46 is a bolt 56 having a head 55, and sandwiched between bolt head 55 and the bulge portion 57 of compression element 51 is a washer 54. Bulge portion 57 of compression element 51 is normally bowed outwardly (to the right in FIG. 5) more than is illustrated in FIG. 5. When bolt 56 is tightened, this increases the threaded engagement between the bolt and internally threaded cylindrical portion 47 of plug 46 and resiliently deforms compression element 51. This in turn decreases the bow in bulge portion 57 of compression element 51, the effect being to decrease the dimension of the compression element in a direction along the axis of cylindrical elements 43, 44. This in turn draws together the two cylindrical elements 43, 44 along their mutual axis until outer end 60 on first cylindrical element 43 engages a ring 59 at that end of second cylindrical element 44 which is integral with post 31. This prevents back and forth axial movement of second cylindrical element 44 in relation to first cylindrical element 43.

As previously noted, compression element 51 is deformed when bolt 55 is tightened to increase its threaded engagement with plug 46. Friction pad 53 is attached to the inner surface of housing front wall 42, and the peripheral portions of compression element 51 slide against friction pad 53. Compression element 51 is mechanically engaged by plug 46 to second cylindrical element 44 in turn integral with post 31, and the frictional engagement of element 51 with pad 53 prevents post 31 and second cylindrical element 44 from jiggling about their pivotal axis, relative to first cylindrical element 43, when the post 31 is in any of its pivotal positions. On the other hand, the friction exerted by the friction pad when the compression element is so deformed, while being sufficient to prevent the jiggling described above, is low enough to permit post 31 to be manually pivoted about its pivotal axis in response to the normal force exerted by a person who grabs and lifts or depresses post 31.

The restraining apparatus includes structure, now to be described, for locking post 31 in its upright position. First cylindrical element 43 has a pair of diametrically opposed, aligned openings 62, 63, and second cylindrical element 44 has a pair of diametrically opposed, aligned openings 64, 65 which are aligned with opening 62, 63 in first cylindrical element 43 when post 31 is in its upright position. Extending radially from first cylindrical element 43 is a tubular guide element 66 which receives a pin 67 also extendible through openings 62–65, when all of those openings are aligned, to lock post 31 in its upright position. Pin 67 has an upper end portion pivotally connected at 68 to a handle member 69 having an inner end connected at 70 to a brace plate 71 in turn welded to front wall 42 of housing 40 and to first cylindrical element 43. Connection 70 mounts handle member 69 for pivotal and slidable movement of the handle member relative to plate 71. Pivotal connection 70 comprises a slot 72 extending from the inner end of handle member 69 and slidably mounted on the shank of a bolt 73 defining pivotal axis 70 and held in place by a nut 74.

When handle number 69 is raised to the position shown in dash-dot lines in FIG. 5, pin 67 is completely withdrawn from both openings 64, 65 in second cylindrical element 44 (as well as from lower opening 63 in first cylindrical element 43), and post 31 is free to be pivoted between its upright and depressed positions. When post 31 is in its upright position, openings 64, 65 on second cylindrical element 44 are aligned with openings 62,63 in first cylindrical element 43, thereby permitting pin 67 to drop, together with handle member 69, to the position shown in full lines in FIG. 5, wherein pin 67 locks post 31 and second cylindrical element 44 for movement, relative to first cylindrical element 43, about the pivotal axis of post 31 (i.e., the mutual axis of cylindrical elements 43, 44). When openings 64, 65 are not aligned with openings 62, 63 in first cylindrical element 43, and pin 67 has been raised, the bottom of pin 67 will abut against the outside surface of second cylindrical element 44. When pin 67 is in a locking position, extending through all of the openings 62–65, the pin and the two pairs of openings comprise structure for distributing the shear force on the pin to each of the four locations along the pin at which the pin extends through a respective one of the four openings. As a result, the pin can withstand a very large shear force.

In the embodiment shown in the figures, the lower portion of tubular guide element 66 is received within opening 62 of first cylindrical element 43, but, in other embodiments, the bottom of guide element 66 may terminate at the outer surface of first cylindrical element 43. In the embodiment of FIG. 5, that part of the shear force which is distributed to opening 62 in cylindrical element 43 is distributed by way of the bottom part of tubular guide element 66.

Structure is provided for limiting movement of pin 67 in both upward and downward directions. More particularly, located at the upper end portion of pin 67 is an open-ended slot 76 having an open upper end 77, extending along pin 67 and terminating at a closed interior slot end 78. A portion of handle member 69 is received within open-ended slot 76, and the pivotal connection 68 between handle member 69 and pin 67 is located at open-ended slot 76.

When pin 67 is in its lower position (full lines in FIG. 5) a lower side surface 79 on handle member 69 abuts against an upper edge 83 on tubular guide 66 to prevent further downward movement of handle member 69 and pin 67. When pin 67 has been withdrawn from openings 63, 64, 65, lower side surface 79 on handle member 69 abuts against an edge of closed interior end 78 of slot 76 on pin 67 to prevent further upward movement of handle member 69 and pin 67.

Figure 6:
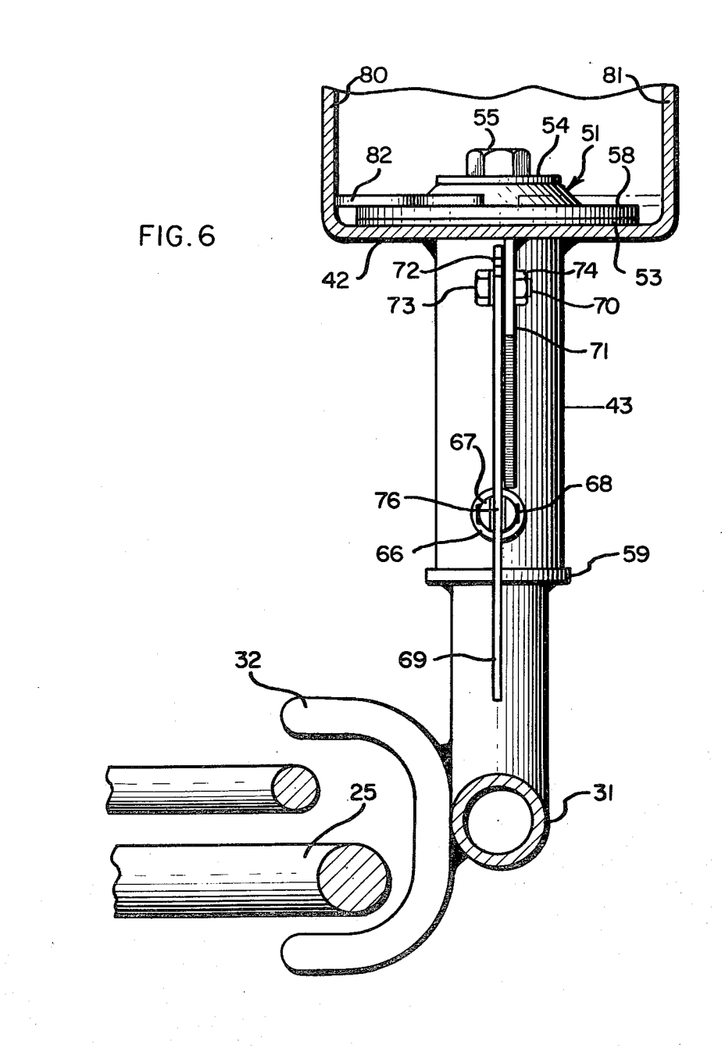
FIG. 6 is an enlarged, fragmentary plan view, partially in section, showing a lower part of the apparatus.
Figure 7:
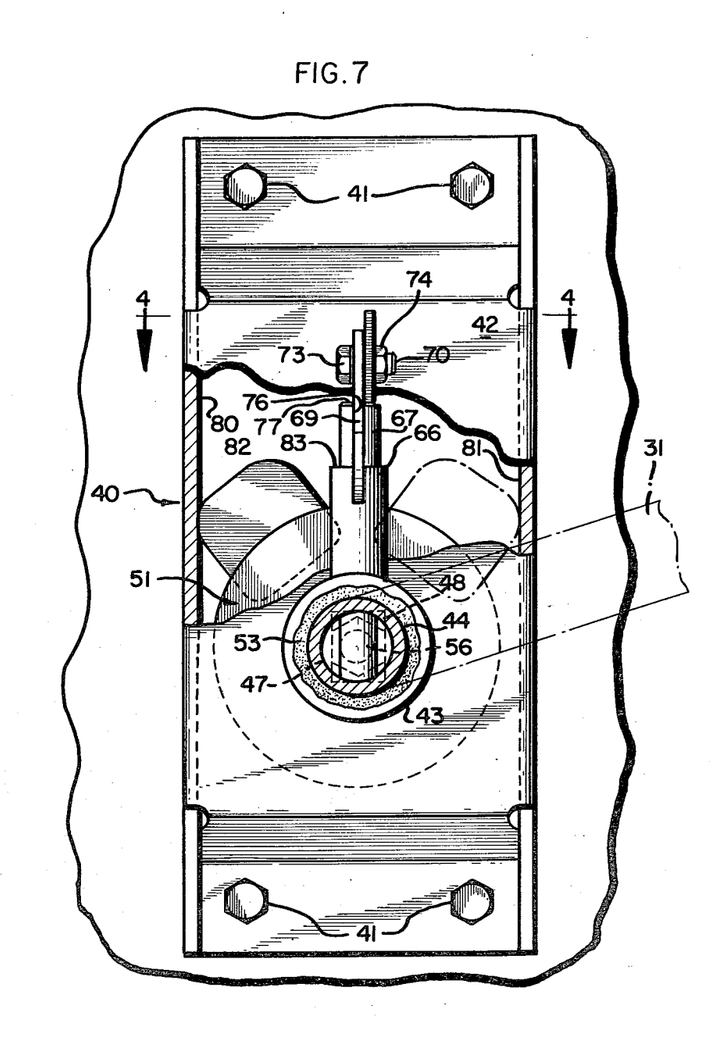
FIG. 7 is an enlarged, fragmentary side elevational view, partially in section, of the lower part of the apparatus.
Figure 8:
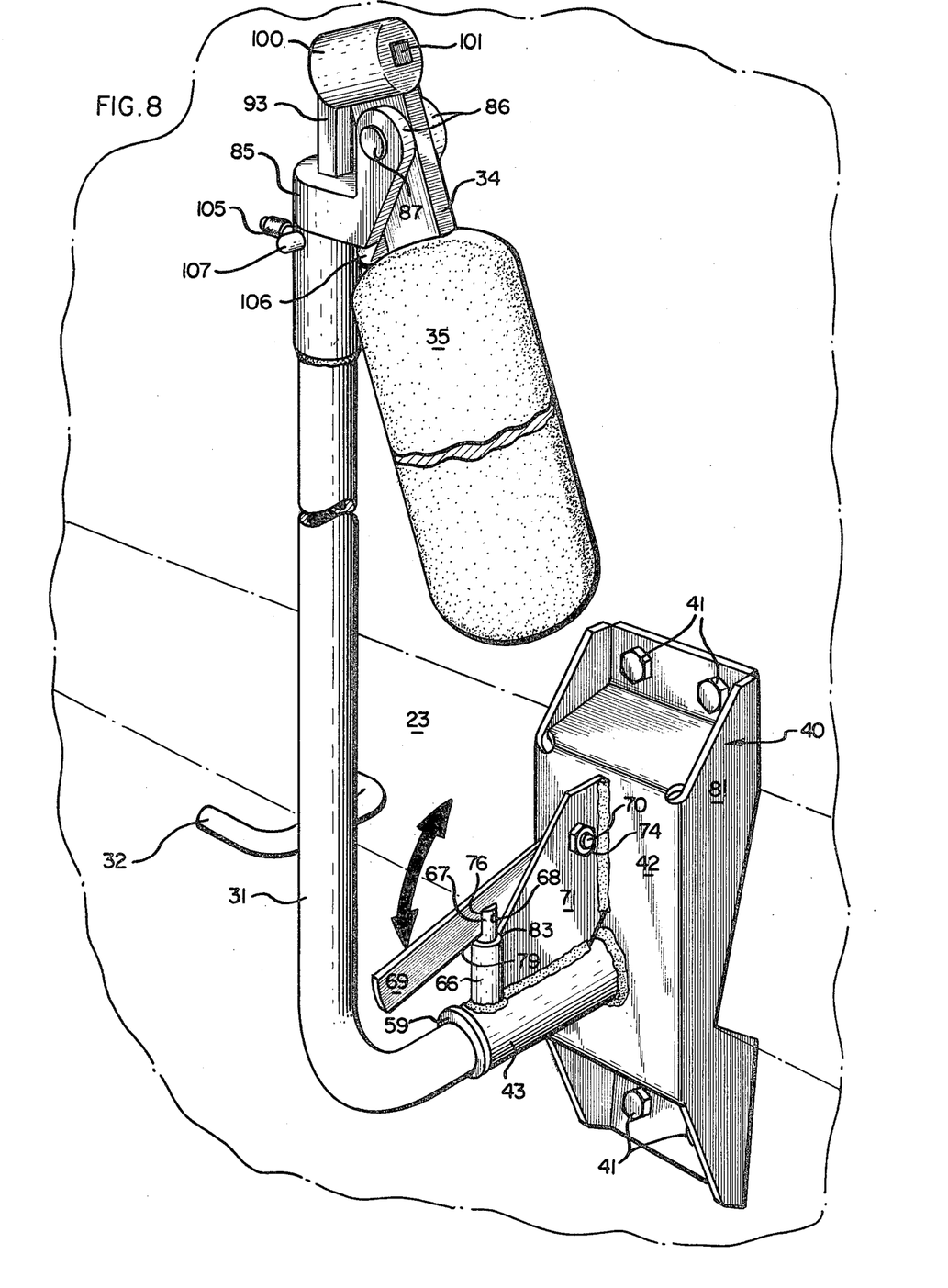
FIG. 8 is a perspective of the apparatus.

FIGS. 5–7 illustrate structure for preventing pivotal movement of post 31 beyond its upright position, in one pivotal direction, and beyond its depressed position in another pivotal direction. This structure is in the form of a tab 82 attached to compression element 51. When post 31 has been pivoted to its upright position, tab 82 abuts against one side wall 80 of housing 40, and when post 31 is in its depressed position, tab 82 abuts against another side wall 81 of housing 40. When tab 82 abuts against side wall 80, to stop post 31 from pivoting beyond its upright position, openings 64, 65 in second cylindrical element 44 (integral with post 31) are in alignment with the openings 62, 63 in first cylindrical element 43. When all of the holes 62–65 are aligned, pin 67 should drop through all of these holes under the urging of gravity. If it doesn't, it can be urged downwardly by depressing handle member 69.

As shown in FIG. 4, part of restraining arm 34 is covered with padding 35 mounted on a rigid member 36 attached by fasteners 37 to arm 34. The structure which mounts arm 34 on post 31 will now be described, with particular reference to FIGS. 1–3 and 8–10.

Located near the top of post 31 is a shoulder 84 (FIG. 9) upon which rests the main body portion 85 of a clevis which is pivotally mounted at shoulder 84 for movement about an axis defined by post 31. The clevis also includes a pair of ears 86, 86 through which extends a pin 87 which also extends through restraining arm 34 located between the two clevis ears 86, 86. Pin 87 defines the pivotal axis about which restraining arm 34 moves between its retracted and extended positions. The pivotal axis of clevis main body portion 85 defines the axis about which restraining arm 34 pivots between its extended and restraining positions.

Figures 9, 10:
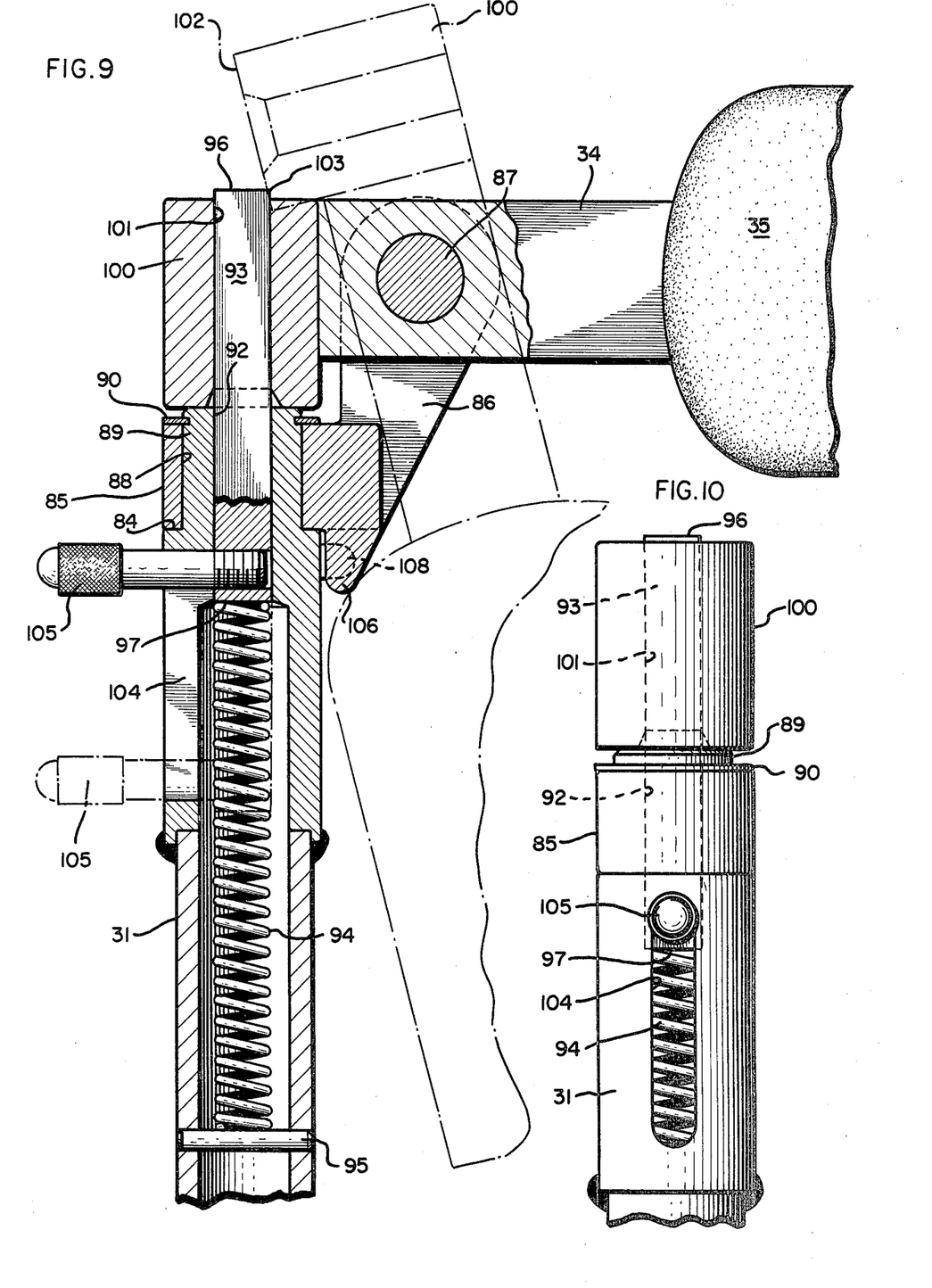
FIG. 9 is an enlarged, fragmentary side elevational view, partially in section, showing an upper part of the apparatus.
FIG. 10 is an enlarged fragmentary rear view of the upper part of the apparatus.

Restraining arm 34 is normally prevented from pivoting between its retracted and extended positions by structure now to be described, with particular reference to FIG. 9.

Extending upwardly from post shoulder 84 is a post terminal portion 89 received in an opening 88 in clevis main body portion 85. A lock washer 90 holds main body portion 85 in place around the post's terminal portion 89. Terminal portion 89 has an opening 92 having a non-circular or polygonal (e.g., rectangular) cross-section for slidably receiving therein a locking member 93 having a corresponding non-circular, polygonal or rectangular cross-section. Locking member 93 has an exterior or upper end 96 and an interior or lower end 97. Lower end 97 is engaged by (or attached to) the upper end portion of a coil spring 94 having a lower end supported by an internal pin 95 within post 31. In one embodiment, the top of coil spring 94 may be threaded about a threaded cylindrical portion (not shown) depending from lower end 97 of locking member 93.

Locking member 93 is mounted for slidable movement in terminal portion opening 92 between extended and retracted positions. When locking member 93 is in the extended position, its exterior end 96 projects outside of opening 92 and beyond terminal portion 89. When the locking member is in the retracted position, its exterior end 96 is located entirely within opening 92. Coil spring 94 normally urges locking member 93 to its extended position.

Located at that end of restraining arm 34 adjacent post 31 is an end element 100 having a rectangular opening 101 corresponding to the rectangular opening 92 in terminal portion 89.

When locking member 93 is in its normal extended position (full lines in FIG. 9) and restraining arm 34 is in its retracted position (dash-dot lines in FIG. 9), a peripheral edge 103 on the locking member's exterior surface 96 engages against a lower surface 102 on end element 100, at 103, to prevent movement of restraining arm 34 about both of its pivotal axes, namely, the axis defined by pin 87 and the axis defined by the clevis main body portion 85. This prevents movement of the restraining arm from its retracted position to its extended position and also prevents movement of the restraining arm to its occupant-restraining position. Restraining arm 34 can be pivoted from its retracted position to one or both of its two other positions when locking member 93 is moved from its extended to its retracted position utilizing structure now to be described.

Located in post 31 adjacent terminal portion 85 is a longitudinally extending slot 104 through which extends a handle 105 having an inner end attached to locking member 93 and an exterior end located on the outside of post 31. Handle 105 may be grasped and depressed to manually move locking member 93, against the urging of spring 94, to its retracted position. As previously noted, when locking member 93 is in its retracted position, it is entirely within opening 92, and the exterior end 96 of the locking member is no longer in a position to prevent pivotal movement of end element 100 or the attached retracting arm 34. Accordingly, restraining arm 34 may pivot about the axis of pin 87 from the position shown in dash-dot lines in FIG. 9 to the position shown in full lines in FIG. 9.

Arm 34 may then be pivoted, about the axis of clevis main body portion 85, from its extended to its restraining position if locking member 93 is retained in its retracted position, and this can be accomplished by manually maintaining handle 105 in the depressed position shown in dash-dot lines in FIG. 9. Pivotal movement of arm 34 beyond its restraining position is prevented by engagement of a stop element 106, extending downwardly from clevis main body portion 85, with a first stop element 107 extending radially outwardly from post 31. Pivotal movement of restraining arm 34 in an opposite direction, beyond its extended, non-restraining position is prevented by engagement of stop element 106 with a second stop element 108 extending radially from post 31.

When arm 34 is in its restraining position, it may be prevented from pivoting about either of its two pivotal axes by releasing handle 105 whereupon spring 94 urges locking member 93 towards its extended position. When locking member 93 is in its extended position, and restraining arm 34 is in either its extended or its restraining positions, locking member 93 is received within rectangular opening 101 in end element 100. When locking member 93 is so received, the engagement between the exterior surface of rectangular locking member 93 and the interior surface of rectangular opening 101 prevents pivotal movement of arm 34 and its associated elements about the axis of clevis main body portion 85; and the engagement between the upper and lower edges of rectangular opening 101 and adjacent surface parts of locking member 93 prevents pivotal movement of arm 34 and its associated end elements 100 about the axis of pin 87. In order to return arm 34 from its restraining position to its extended position and then to its retracted position, one need merely depress handle 105 to its retracted position which, in turn, withdraws locking member 93 from opening 101 in turn freeing arm 34 for pivotal movement about both of its pivotal axes.

Post 31 is not readily movable from its upright to its depressed position until arm 34 has been returned to its retracted position. When arm 34 is in either its extended or its restraining positions, it will interfere with the manipulation of post 31 from its upright to its depressed position. This encourages the occupant to retract arm 34 before depressing post 31, which is desirable.

The foregoing detailed description has been given for clearness of understanding only, and no unnecessary limitations should be understood therefrom, as modifications will be obvious to those skilled in the art.

I claim:

1. In a vehicle having a wall and a member at a location spaced from said wall, an apparatus for restraining a wheelchair and its occupant, said apparatus comprising:
    a first U-shaped element;
    means for mounting said first U-shaped element on said member;
    said first U-shaped element comprising means for receiving the periphery of a wheelchair wheel;
    an elongated post located alongside said vehicle wall;
    means mounting said post on said wall for pivotal movement between a depressed position, in which said post extends alongside a bottom of said wall, and an upright position;
    a second U-shaped element attached to said post and located in opposed facing relation to said first U-shaped element when said post is in its upright position;
    said second U-shaped element comprising means for receiving the periphery of a wheelchair wheel at a location thereon substantially diametrically opposite to the location thereon received in said first U-shaped element;
    said first and second U-shaped elements comprising means cooperating to hold said wheelchair wheel in compression.

2. An apparatus as recited in claim 1 and comprising:
    a restraining arm;
    means mounting said restraining arm on said post for pivotal movement about a first axis between a retracted position in which said arm extends alongside said post and an extended position in which said arm extends outwardly from said post along said vehicle wall;
    and means mounting said arm for pivotal movement about a second axis between said extended position and a restraining position in which said arm extends transversely from said wall across the chest of an occupant in said wheelchair.

3. An apparatus for restraining a wheelchair and its occupant in a vehicle having a wall, said apparatus comprising:
    an elongated post located alongside said vehicle wall;
    means mounting said post on said wall for pivotal movement about an axis, between a depressed position, in which said post extends alongside a bottom of said wall, and an upright position;
    a restraining arm;
    means mounting said restraining arm on said post for pivotal movement about a first axis between a retracted position in which said arm extends alongside said post and an extended position in which said arm extends outwardly from said post along said vehicle wall;
    and means mounting said restraining arm for pivotal movement about a second axis transverse to said first axis, and between said extended position and a restraining position in which said arm extends transversely from said wall across the chest of an occupant in said wheelchair.

4. An apparatus as recited in claim 3 and comprising:
    friction means for preventing said post from jiggling about its axis of pivotal movement when the post is in other than its upright position.

5. An apparatus as recited in claim 3 wherein said mounting means for said post comprises:
    a first cylindrical element having two ends and disposed along the axis of pivotal movement of said post;
    means for fixing one end of said first cylindrical element to said vehicle wall;
    said first cylindrical element having another end opposite said one end;
    a second cylindrical element disposed along said axis of pivotal movement, in telescoping relation to said first cylindrical element, and having one end integral with said post and another end opposite said one end;

and means for preventing back and forth axial movement of said second cylindrical element in relation to said first cylindrical element.

6. An apparatus as recited in claim 5 wherein said last recited means comprises;

bracket means attached to said vehicle wall and having inner and outer surfaces;

said first cylindrical element being attached to said outer surface of the bracket means;

first threaded means disposed along the axis of said cylindrical elements and attached to said other end of said second cylindrical element;

second threaded means having one end in adjustable threaded engagement with said first threaded means and extending through said bracket means and terminating at another end of the second threaded means located inwardly of the inner surface of the bracket means;

a springable, substantially bell-shaped compression element bearing against said inner surface of the bracket means and located between the latter and said other end of the second threaded means;

said compression element having a dimension extending along the axis of said cylindrical elements;

and means at said other end of the second threaded means, bearing against the compression element, for deforming said compression element to decrease said dimension along the axis of the cylindrical elements in response to an increase in the extent of threaded engagement between the first and second threaded means, whereby said first and second cylindrical elements are telescopically drawn together along their mutual axis.

7. An apparatus as recited in claim 6 and comprising:
stop means on the second cylindrical element for abuttment with another end of the first cylindrical element, opposite said one end thereof.

8. An apparatus as recited in claim 6 and comprising:
a friction pad sandwiched between the inner surface of said bracket and said compression element and comprising means for preventing said post and said second cylindrical element from jiggling about said axis thereof, relative to said first cylindrical element, when the post is in other than its upright position.

9. An apparatus as recited in claim 8 and comprising:
stop means on the second cylindrical element for abuttment with another end of the first cylindrical element, opposite said one end thereof;
said compression element being deformed to an extent sufficient to draw said stop means into abuttment with said another end of the first cylindrical element;
the friction exerted by said friction pad when said compression element is so deformed being sufficient to prevent said jiggling while permitting said post to be manually pivotted about its pivotal axis.

10. An apparatus as recited in claim 3 and comprising:
releasable means for locking said post in said upright position.

11. An apparatus as recited in claim 10 wherein:
said mounting means for said post comprises a first cylindrical element disposed along the axis of pivotal movement of said post;

means fixing one end of said first cylindrical element to said vehicle wall;

said post-mounting means further comprises a second cylindrical element disposed along said axis of pivotal movement, in telescoping relation to said first cylindrical element, and having one end integral with said post;

a pair of diametrically aligned openings in each of said cylindrical elements;

said two pairs of aligned openings being mutually aligned when said post is in its upright position;

said releasable locking means for the post comprises pin means extendable through said two pairs of mutually aligned openings, there being four locations on said pin at which the pin extends through an opening;

said pin means and said two pairs of openings comprising means for distributing the shear force on said pin to each of the four locations along said pin at which the pin extends through a respective one of said four openings.

12. An apparatus as recited in claim 11 and comprising:

first stop means for limiting axial movement of said pin means in a first direction to a locking position in which said pin extends through said two pairs of aligned openings;

and second stop means for limiting axial movement of said pin means in a second direction, opposite said first direction, at an unlocking position in which said pin means is withdrawn from both of said openings in one of said cylindrical element;

13. An apparatus as recited in claim 12 and comprising:

tubular guide means receiving said pin means, said guide means being aligned with said pair of openings in said first cylindrical element;

an elongated handle member having a pair of opposite ends;

means mounting one end of said handle member to said vehicle wall for pivotal and slidable movement of the handle member in relation to said wall;

said pin means having one end located outside said tubular guide means;

and an open-ended slot extending from an open end thereof at said one of the pin means, along the length of the pin means, and terminating at a closed, interior end;

a portion of said handle member being received with said open ended slot;

means pivotally connecting said handle member to said pin means at said open ended slot;

said first stop means comprising first means on said handle member and means on said tubular guide means disposed to abut each other when said pin means extends through said two pairs of aligned openings;

and said second stop means comprises second means on said handle member and means on said closed, interior slot end disposed to abut each other when said pin means has been withdrawn from both of said openings in one of said cylindrical elements.

14. An apparatus as recited in claim 3 and comprising:
releasable means for preventing movement of said restraining arm about said first axis.

15. An apparatus as recited in claim 14 wherein said releasable means also comprises:

means for preventing movement of said restraining arm about said second axis.

16. An apparatus as recited in claim 15 and comprising:
   manually actuable means for releasing said releasable means to permit movement of said restraining arm about said first and second axes.

17. An apparatus as recited in claim 15 wherein said mounting means for said restraining arm comprises:
   a link element having means defining said first axis;
   means mounting said link element on said post for pivotal movement of said link element about said second axis;
   and means mounting said restraining arm on said link element for pivotal movement of the arm about said first axis.

18. An apparatus as recited in claim 17 wherein:
   said link element is a clevis having a pair of ears through which extends said first axis;
   said clevis comprising a main body portion having an opening aligned with said second axis;
   said post comprising a terminal portion disposed along said second axis and received within said opening in the main body portion of the clevis.

19. An apparatus as recited in claim 18 wherein said releasable means comprises:
   a polygonal opening in said terminal portion of the post, said opening being aligned with said second axis;
   a locking member, having a polygonal cross-section, received within said polygonal opening;
   said locking member having interior and exterior ends;
   said polygonal opening comprising means mounting said locking member for slidable movement in said opening between an extended position in which said exterior end of the locking member projects outside of said non-circular opening and beyond said terminal portion and a retracted position in which said exterior end is located within the non-circular opening;
   means normally urging said locking member to its extended position,
   an end element on said restraining arm;
   a polygonal opening in said end element for receiving said locking member when the restraining arm is in its extended and restraining positions;
   and means on said end element and on the exterior end of said locking member disposed to abut each other when the restraining arm is in its retracted position and the locking member is in its extended position, to prevent movement of said restraining arm about said first and second axes.

20. An apparatus as recited in claim 19 and comprising:
   means in said polygonal opening in said end element and on said locking member cooperating to prevent movement of said restraining arm about said first and second axes when the restraining arm is in its extended or restraining positions and said locking member is in its extended position.

21. An apparatus as recited in claim 20 wherein:
   said urging means for the locking member comprises spring means;
   said apparatus comprising a slot in said post adjacent the terminal portion of said post;
   and a handle having an inner end attached to said locking member;
   said handle extending through said slot in the terminal portion of the post and terminating at an exterior end on the outside of said post, whereby said handle may be grasped for manually moving said locking member to its retracted position against the urging of said spring means.

* * * * *